United States Patent [19]

Oishi et al.

[11] 4,249,176
[45] Feb. 3, 1981

[54] FOLLOWING DISTANCE MEASURING COMMUNICATION SYSTEM

[75] Inventors: Kazuo Oishi, Oobu; Matatoyo Hinachi, Nagoya; Takeshi Matsui, Kariya; Masao Kotera, Okazaki, all of Japan

[73] Assignee: Nippon Soken, Inc., Nishio, Japan

[21] Appl. No.: 951,956

[22] Filed: Oct. 16, 1978

Related U.S. Application Data

[63] Continuation of Ser. No. 868,227, Jan. 9, 1978, abandoned, which is a continuation of Ser. No. 760,019, Jan. 17, 1977, abandoned, which is a continuation of Ser. No. 536,991, Dec. 27, 1974, abandoned.

[30] Foreign Application Priority Data

Jan. 28, 1974 [JP] Japan .................. 49-12094
Feb. 11, 1974 [JP] Japan .................. 49-16481

[51] Int. Cl.² .............................. G01S 9/56
[52] U.S. Cl. ..................... 343/6.5 LC; 343/7 VM
[58] Field of Search ........... 343/6.5 R, 6.5 LC, 7 VM

[56] References Cited

U.S. PATENT DOCUMENTS

| | | | |
|---|---|---|---|
| 2,403,755 | 7/1946 | Rankin | 343/7.5 |
| 3,341,845 | 9/1967 | Deman | 343/6.5 LC |
| 3,412,400 | 11/1968 | Aker | 343/7.3 |
| 3,760,414 | 9/1973 | Nicolson | 343/7 VM X |
| 3,810,179 | 5/1974 | Merrick | 343/6.5 R |

Primary Examiner—T. H. Tubbesing
Attorney, Agent, or Firm—Cushman, Darby & Cushman

[57] ABSTRACT

A following distance measuring communication system comprising a transmitter and a receiver which are mounted on the front part of a following automotive vehicle, a time measuring unit connected to the transmitter and the receiver provided on the following automobile, and an answering transmitter-receiver unit mounted on the rear part of a preceeding vehicle. A pulse modulated signal is transmitted from the transmitter on the following vehicle, and this signal is received by the answering transmitter-receiver unit on the preceeding vehicle. At the instant that the signal is received, the answering transmitter-receiver unit on the preceeding vehicle generates a reply signal which is in turn received by the receiver on the following vehicle. The time required for this process is measured by the time measuring unit connected to the following vehicle receiver to determine the distance between the following vehicle and the preceeding vehicle.

10 Claims, 13 Drawing Figures

FOLLOWING DISTANCE MEASURING COMMUNICATION SYSTEM

This application is a continuation of our copending application Ser. No. 868,227 filed Jan. 9, 1978, now abandoned, which in turn was a continuation of our copending application Ser. No. 760,019 filed Jan. 17, 1977, now abandoned and the latter was a continuation of our copending application Ser. No. 536,991 filed Dec. 27, 1974 and now abandoned.

BACKGROUND OF THE INVENTION

1. Field of the Invention

The present invention relates to a following distance measuring communication system whereby a measuring vehicle is enabled to measure its distance from a measured vehicle that is necessary for safe driving thereof and which enables the exchange of information between the vehicles.

2. Description of the Prior Art

While a known type of radar system in which waves are continuously radiated and the reflected wave from an object is received and computed to detect the distance of the reflecting object, may be employed as such in the measurement of following distance, there is a disadvantage that the amount of electric energy of the radiated waves is limited due to their harmful effects on the human body, etc., and the capacity of oscillator and so on, thus reducing the electric energy of the reflected wave. Another disadvantage is that in order to prevent erroneous operation of the system due to the detection of the reflected waves from various objects such as telephone poles and houses by the road, it is necessary to use large antennas which are difficult to mount on vehicles.

SUMMARY OF THE INVENTORY

With a view to overcoming the foregoing difficulty, it is an object of the present invention to provide a following distance measuring communication system wherein a measurement start signal including a data signal is radiated from a measuring vehicle in at least one direction, and upon reception of the measurement start signal by a measured vehicle a reply signal is reflectively radiated from the measured vehicle in a direction corresponding to the direction of arrival of the start signal and it is received by the measuring vehicle to measure the time interval between the radiation of the measurement start signal and the reception of the reply signal and thereby to convert the measured time interval into the distance between the vehicles.

The system according to the present invention has among its great advantages the fact that it is capable of generating a reply signal which is far stronger than the reflected signals from electric poles, houses, etc. standing by the road on which the vehicles are running and accurately and positively measuring the following distance between the vehicles and moreover it is capable of reducing the electric energy of the required measurement start signal.

Another great advantage of the system of this invention is that it is capable of continuously changing the period of the pulse waves generated from each measuring vehicle in a sequence different from those of other vehicles, whereby the probability of mistaking the reflected pulse wave from an approaching vehicle for the reply pulse wave is reduced.

Still another great advantage of the system of this invention is that it is capable of not only measuring distance through a secondary radar system employing an interrogator and a transponder (which will be described later), but also utilizing the interrogation signal for the transmission of information by a pulse communication system, with the result that the provision of the interrogator on a vehicle enables the exchange of information between the vehicle and the location of the transponder and also the measurement of the distance between the vehicle and the location of the transponder, thus making the present invention highly useful in applications such as a driving assisting system.

DESCRIPTION OF THE PREFERRED EMBODIMENTS

The present invention will now be described in greater detail with reference to the illustrated embodiments.

Figure 1:
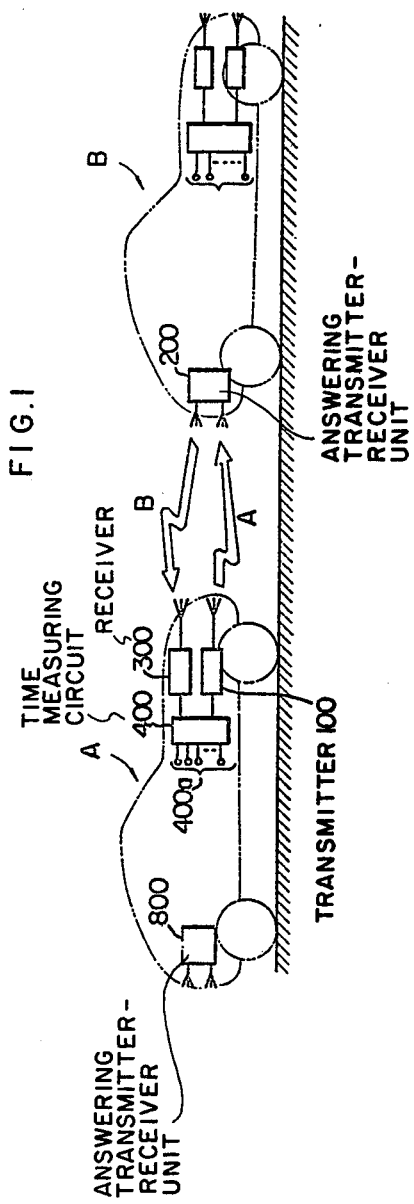
FIG. 1 is a block diagram showing a first embodiment of a following distance measuring communication system according to the present invention.

Referring to FIG. 1 illustrating a block diagram showing the first embodiment of the following distance measuring communication system of this invention, symbol A designates a following vehicle constituting a measuring vehicle, B a preceeding vehicle constituting a measured vehicle. Numeral 100 designates a transmitter for radiating a measurement start signal in a fixed direction toward the front of the following vehicle during the measuring period. Numeral 200 designates an answering transmitter-receiver unit which, upon receiving the measurement start signal, automatically responds to the signal and reflectively radiates a reply signal in a fixed direction to the back of the preceeding vehicle corresponding to the direction of arrival of the measurement start signal. Numeral 300 designates a receiver for receiving the reply signal, 400 a time measuring circuit for measuring the time interval between the radiation of the measurement start signal from the transmitter 100 and the reception of the reply signal by the receiver 300 and calculating the following distance between the vehicles to generate a following distance signal at its output terminals 400a. The transmitter 100, the receiver 300 and the time measuring circuit 400 constitute a measuring transmitter-receiver unit (hereinafter simply referred to as an interrogator. Numeral 800 designates an answering transmitter-receiver unit (hereinafter simply referred to as a transponder) which is mounted on the following vehicle A and which is identical with the answering transmitter-receiver unit 200.

Figure 2:
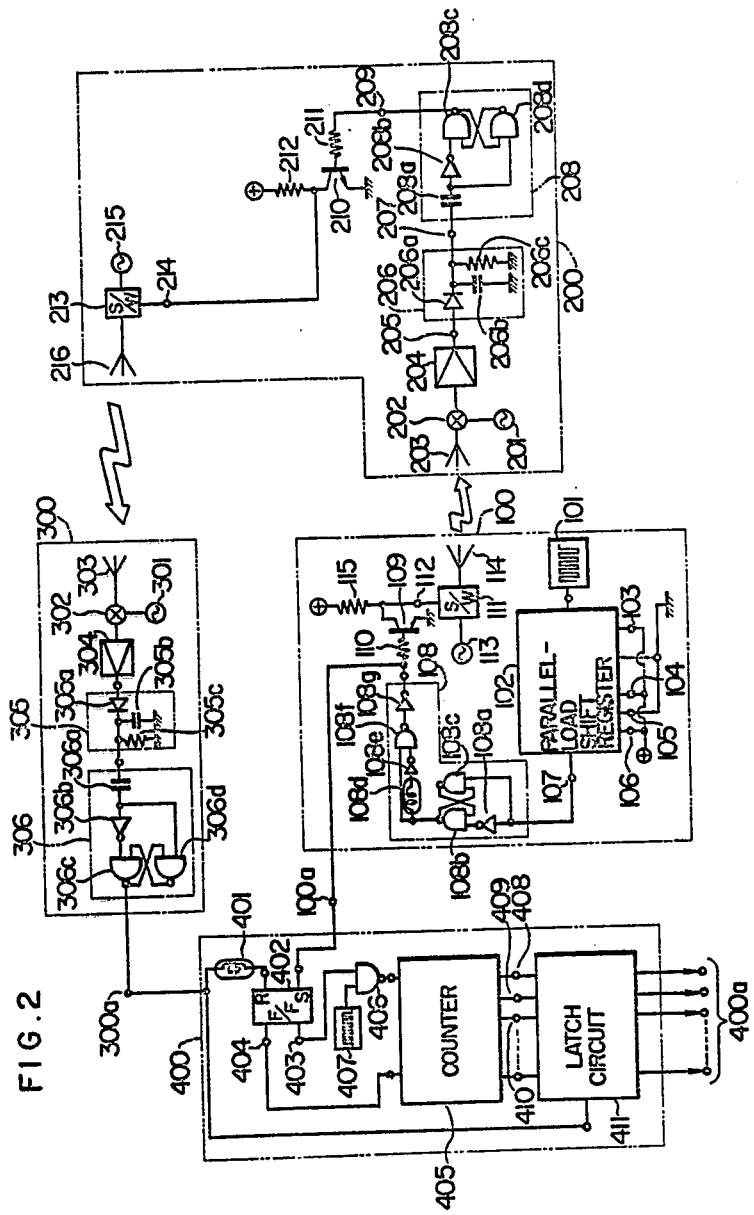
FIG. 2 is a wiring diagram showing a detailed circuit construction of the first embodiment of the system according to the invention.

FIG. 2 illustrates a wiring diagram showing a detailed circuit construction of the system according to the first embodiment of this invention. In FIG. 2, numeral 101 designates a clock pulse generator, 102 a parallel-load shift register of a known type for generating at its output terminal 107 a rectangular signal whose time interval and time width vary randomly with time in the order corresponding to a coded signal applied to data input terminals 103, 104, 105 and 106. Numeral 108 designates a one-shot circuit comprising inverters 108a, 108e and 108g, a delay element 108d and NAND gates 108b, 108c and 108f, 109 a transistor connected to the one-shot circuit 108 through a base resistor 110 and having a collector resistor 115. Numeral 111 designates a high-frequency switch having its control terminal 112 connected to the collector of the transistor 109 and disposed between a microwave oscillator 113 and an antenna 114, whereby the microwave signal from the oscillator 113 is subjected to pulse modulation and the pulse wave constituting the measurement start signal is radiated from the antenna 114.

Numeral 201 designates a microwave oscillator which oscillates at a frequency higher than the oscillation frequency (several GHz to several tens GHz) of the microwave oscillator 113 by about 200 MHz, 202 a mixer where the pulse wave received from the antenna 203 is mixed with the wave from the microwave oscillator 201 to produce an intermediate frequency wave, 204 an intermediate frequency amplifier, 206 a detector circuit comprising a diode 206a, a capacitor 206b and a resistor 206c and designed to detect the intermediate frequency signal at a terminal 205 and generate its output at a terminal 207. Numeral 208 designates a signal shaper comprising a capacitor 208a, an inverter 208b and NAND gates 208c and 208d and designed to reshape the signal from the terminal 207 and generate the resulting pulse output at a terminal 209, 210 a transistor connected to the terminal 209 through a base resistor 211, 212 a collector resistor. Numeral 213 designates a high-frequency switch having a control terminal 214 connected to the collector of the transistor 210 and disposed between a microwave oscillator 215 and an antenna 216 whereby to subject the microwave signal from the microwave oscillator 215 to pulse modulation and generate the reply pulse wave constituting the reply signal from the antenna 216.

Numeral 301 designates a microwave oscillator which oscillates at a frequency higher than the oscillation frequency of the microwave oscillator 215 by about 200 MHz, 302 a mixer where the received wave from the antenna 303 is mixed with the wave from the microwave oscillator 301 to produce an intermediate frequency, 304 an intermediate frequency amplifier, 305 a detector circuit comprising a diode 305a, a capacitor 305b and a resistor 305c, 306 a signal shaper comprising a capacitor 306a, an inverter 306b and NAND gates 306c and 306d for generating the resulting pulse output at a terminal 300a.

Numeral 402 designates a flip-flop circuit having its set terminal connected to a first trigger terminal 100a of the transmitter 100 and its reset terminal connected through a delay element 401 to the second trigger terminal 300a of the receiver 300, whereby when the potential at the first trigger terminal 100a goes to a high level upon the radiation of the pulse wave from the transmitter 100, the potential at an output terminal 403 goes to the high level and the potential at an output terminal 404 goes to a low level. Numeral 405 designates a counter, 406 a NAND gate whereby the clock pulses from a clock pulse generator 407 are passed therethrough and applied to the clock pulse terminal of the counter 405 only when the potential at the output terminal 403 is at the high level. Numerals 408, 409 and 410 designate the output terminals of the counter 405 which deliver the count of the clock pulses counted and which are reset by the high level signal at the output terminal 404, 411 a latch circuit of a known type whereby at the instant that the potential at the second trigger terminal 300a changes from the low level to the high level, the output count at the output terminals 408, 409 and 410 of the counter 405 is stored at the terminal 400a.

Figure 3:
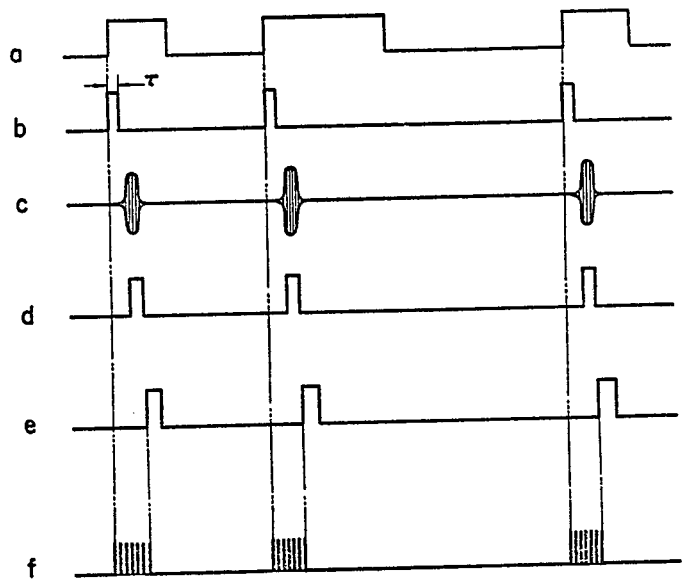
FIG. 3 is a waveform diagram which is useful for explaining the operation.

With the construction described above, the operation of the first embodiment will be described with reference to the time charts shown in FIG. 3. In accordance with the coded signal at the terminals 103, 104, 105 and 106, the rectangular signal shown in FIG. 3a is generated from the output terminal 107 of the parallel-load shift register 102. At the instant that the potential at the terminal 107 changes from the low level to the high level, a trigger pulse (FIG. 3b) whose time width $\tau$ is determined by the delay element 108d is generated at the output terminal of the one-shot circuit 108. This trigger pulse is applied to the set terminal of the flip-flop circuit 402 through the first trigger terminal 100a, so that the terminal 403 goes to the high level and the counter 405 starts counting the clock pulses from the clock pulse generator 407.

Simultaneously with the counting of the counter 405, the potential at the output terminal of the one-shot circuit 108 is transferred to the base of the transistor 109 through the base resistor 110, so that the collector of the transistor 109 is maintained at the low level only for the duration of the time width $\tau$ and the high-frequency switch 111 passes therethrough the wave from the microwave oscillator 113. Consequently, this microwave signal is subjected to pulse modulation and it is radiated through the antenna 114 in a predetermined fixed direction into the air in front of the vehicle. This radiated pulse wave of microwave energy is received by the antenna 203 mounted on the rear portion of the preceeding vehicle B constituting the measured vehicle, and the received wave is mixed with the wave from the microwave oscillator 201 thereby producing the intermediate frequency wave shown in waveform c of FIG. 3 at the output of the mixer 202. This intermediate frequency signal is detected by the detector circuit 206 and it is then reshaped by the signal shaper 208 to produce at the terminal 209 the reply trigger pulse shown in waveform d of FIG. 3. In response to the reply trigger pulse, the transistor 210 short-circuits the control terminal 214 of the high-frequency switch 213 and the output wave from the microwave oscillator 215 is subjected to pulse modulation and the resulting reply pulse wave is reflectively and responsively radiated through the antenna 216 toward the following vehicle A constituting the measuring vehicle. This responsively radiated wave of the reply pulse wave is received through the antenna 303 and the received reply wave is mixed with the microwave signal from the microwave oscillator 301 thus producing the intermediate frequency wave at the output terminal of the mixer 302. The intermediate frequency wave is passed through the amplifier 304, the detector circuit 305 and the signal shaper 306, and the reply pulse shown in waveform e of FIG. 3 is generated at the second trigger terminal 300a. This reply pulse is applied to the latch circuit 411, so that at the instant that the reply pulse changes from the low level to the high level, the count of the counter 405 is stored at the terminals 400a. Consequently, the number of the clock pulses (waveform f of FIG. 3) corresponding to the time required for the wave to travel from the following vehicle to the preceeding vehicle and back to the following vehicle is generated, i.e., changed to a count signal at the terminals 400a.

The experiments conducted with the apparatus built according to the above-described first embodiment, showed that the measurable following distance 113 and 215 was over 100 (m) when the oscillation frequency of the respective microwave oscillators was set to about 10 (GHz), the time width of the radiated pulse wave to about 100 (ns), the power of the radiated pulse wave to about 20 (m W), the aperture of the antennas to 5 (cm)×5 (cm) and the length of the antennas to 5 (cm).

While, in the first embodiment described above, the pulse wave is used as the measurement start signal, any other types of wave such as the step form wave may be employed. In this case, the reply signal may consist of either the step form wave or the pulse wave. In short, any kind of signal may be used, provided that the radiation starting time can be discriminated. In this case, the required detailed construction of the signal processing interrogator mounted on the measuring vehicle and of the signal processing transponder mounted on the measured vehicle may be easily obtained by correspondingly modifying the constructions of FIG. 2.

Further, while the following distance is measured by measuring the time interval between the radiation of the measurement start signal and the reception of the reply signal by means of a digital method in which the number of clock pulses is counted, it is of course possible to use other analog methods.

Furthermore, while the measured following distance is stored at the output terminals 400a of the time measuring circuit 400 and no specific examples of use application of the following distance information has been shown, the following distance information may for example be indicated on an indicator to let the driver of the measuring vehicle known the following distance information, or alternately the following distance information may be used to provide the necessary information for controlling the operation of an automatically operated vehicle.

The construction and operation of a second embodiment of this invention will now be described with reference to FIGS. 4 through 13.

Figure 4:
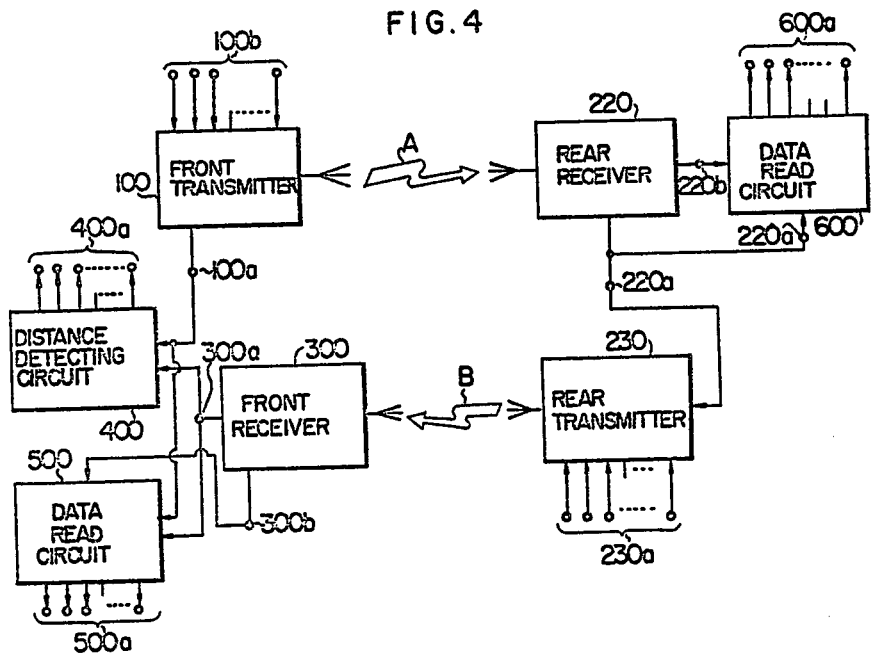
FIG. 4 is a block diagram showing a second embodiment of the following distance measuring communication system according to the invention.

Referring first to FIG. 4 illustrating a schematic block diagram of the second embodiment, numeral 100 designates a front transmitter constituting an interrogating transmitter for radiating an interrogation wave A and having first external code terminals 100b for receiving a data signal and a first trigger terminal 100a for delivering a measurement start trigger pulse, 220 a rear receiver constituting a transponder receiver for receiving and demodulating the interrogation wave A and generating a reply trigger pulse at its fourth trigger terminal 220a and also generating a demodulated pulse train at its fifth trigger terminal 220b. Numeral 600 designates a data read circuit connected to the fourth trigger terminal 220a and the fifth trigger terminal 220b and adapted to generate the read data signal at its output terminals 600a, 230 a rear transmitter constituting a transponder transmitter and connected to the fourth trigger terminal 220a and second external code terminals 230a for radiating a reply wave B in a direction corresponding to the direction of arrival of the interrogation wave A. Numeral 300 designates a front receiver constituting an interrogator receiver for receiving and demodulating the reply wave B and generating a measurement end trigger pulse at its second trigger terminal 300a and a demodulated pulse train at its third trigger terminal 300b. Numeral 500 designates a data read circuit connected to the first trigger terminal 100a, the second trigger terminal 300a and the third trigger terminal 300b and adapted to deliver the read data signal at its output terminal 500a, 400 a following distance detecting circuit connected to the first trigger terminal 100a and the second trigger terminal 300a and adapted to generate a measured following distance signal at its output terminals 400a. The front transmitter 100, the front receiver 300, the data read circuit 500 and the following distance detecting circuit 400 constitute an interrogator, while the rear receiver 220, the data read circuit 600 and the rear transmitter 230 constitute a transponder.

Figure 5:
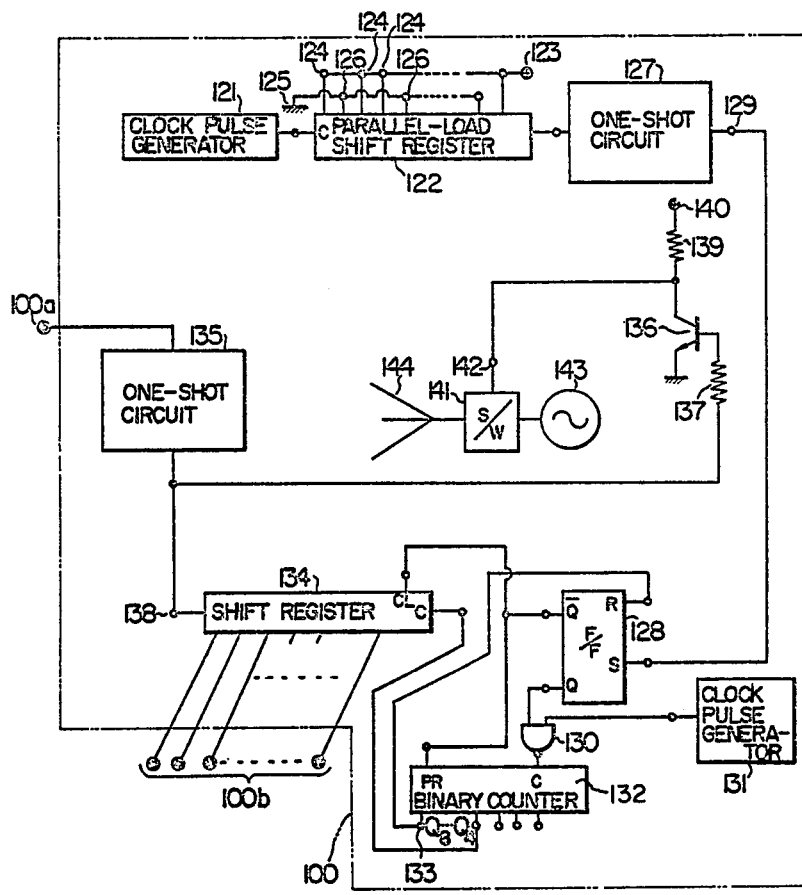
FIG. 5 is a detailed block diagram of the front transmitter used in the second embodiment.

Referring next to FIG. 5 illustrating a detailed block diagram of the front transmitter 100, numeral 121 designates a clock pulse generator, 122 a parallel-load shift register of a known type having parallel inputs 124 connected to a high level voltage terminal 123, parallel inputs 126 connected to a low level voltage terminal 125 and a clock terminal connected to the clock pulse generator 121 and adapted to generate a rectangular signal whose time interval and time width may be successively changed within a predetermined period to randomly change the radiation of the interrogation wave. Numeral 127 designates a one-shot circuit of a known type connected to the output terminal of the shift register 122, 128 a flip-flop circuit having its set terminal connected to an output terminal 129 of the one-shot circuit 127 and having its output terminal Q connected to one input terminal of a NAND gate 130, 131 a clock pulse generator connected to the other input terminal of the NAND gate 130 and adapted to generate clock pulses having a frequency about 100 times the frequency of the clock pulse generator 121. Numeral 132 designates a binary counter having its clock terminal connected to the output terminal of the NAND gate 130, its output terminal $Q_8$ connected at junction 133 to the reset terminal of the flip-flop circuit 128 and its preset terminal connected to the output terminal $\overline{Q}$ of the flip-flop circuit 128 and adapted to generate at its output terminal $Q_4$ reference signals whose potential changes from the low to high level or from the high to low in response to every 8 clock pulses received. Numeral 134 designates a shift register of a known type having its parallel input terminals connected to the first external code terminals 100b, its clock terminal connected to the output terminal $Q_4$ of the binary counter 132 and its clear terminal connected to the output terminal $\overline{Q}$ of the flip-flop circuit 128 and adapted to convert the data signal applied to the first external code terminals 100b into a coded train of pulses. Numeral 135 designates a one-shot circuit connected to an output terminal 138 of the shift register 134 and having the first trigger terminal 100a as an output, 136 a transistor having its base terminal connected to the output terminal 138 of the shift register 134 through a resistor 137, 139 a collector resistor, 140 a positive voltage terminal, 141 a high-frequency switch having its control terminal 142 connected to the collector terminal of the transistor 136, its high-frequency input terminal to a microwave oscillator 143 and its high-frequency output terminal connected to an antenna 144 for accomplishing the required pulse modulation with the pulse train from the shift register 134.

Figure 6:
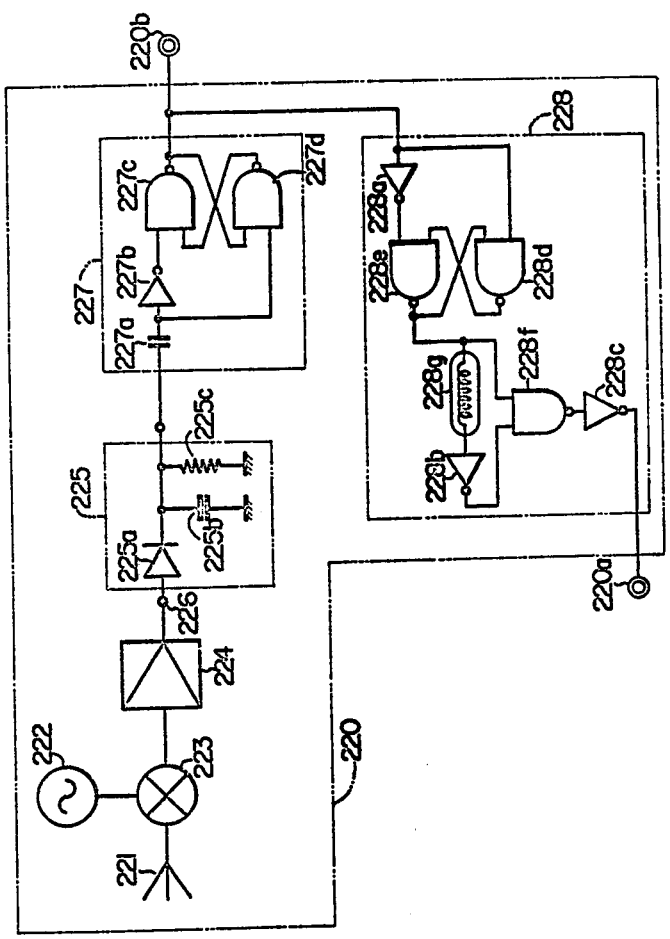
FIG. 6 is a detailed block diagram of the rear receiver used in the second embodiment.

In FIG. 6 illustrating a detailed block diagram of the rear receiver 220, numeral 221 designates an antenna, 222 a microwave oscillator which oscillates at a frequency higher than the oscillation frequency of the microwave oscillator 143 by about 200 MHz, 223 a mixer connected to the antenna 221 and the microwave oscillator 222 for mixing the signals received therefrom and applying its output signal to an intermediate frequency amplifier 224. Numeral 225 designates a detector circuit comprising a diode 225a, a capacitor 225b and a resistor 225c and connected to an output terminal 226 of the intermediary frequency amplifier 224, 227 a comparator comprising a capacitor 227a, an inverter 227b and NAND gates 227c and 227d and connected to the output terminal of the detector circuit 225 for generating a demodulated pulse train at the fifth trigger terminal 220b. Numeral 228 designates a one-shot circuit comprising three inverters 228a, 228b and 228c, three NAND gates 228d, 228e and 228f and a delay element 228g and adapted to generate at the fourth trigger terminal 220a a reply trigger pulse from the demodulated pulse train generated at the output terminal of the signal shaper 227.

Figure 7:
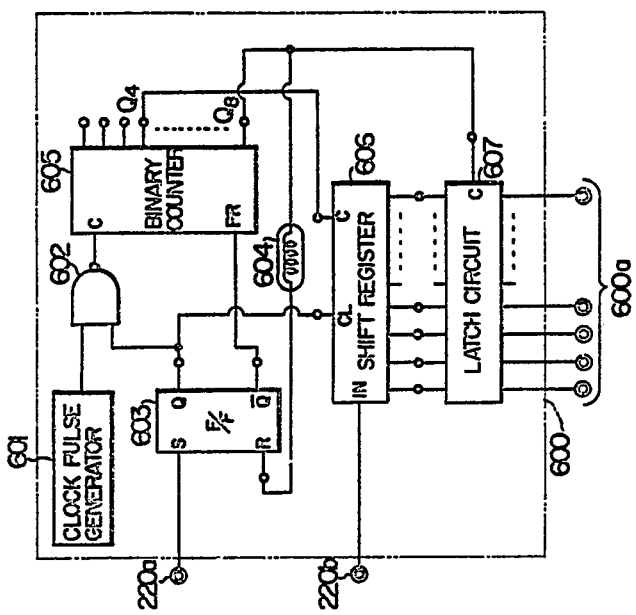
FIG. 7 is a detailed block diagram of the data read circuit used in the second embodiment.

Next, in FIG. 7 illustrating a detailed block diagram of the data read circuit 600, numeral 601 designates a clock pulse generator adapted to oscillate at the same frequency as the clock pulse oscillator 131, 602 a NAND gate connected to the clock pulse generator 601, 603 a flip-flop circuit having its set terminal connected to the fourth trigger terminal 220a and its output terminal Q connected to the other input terminal of the NAND gate 602, 605 a binary counter having its clock terminal connected to the output terminal of the NAND gate 602 and its preset terminal to the output terminal $\overline{Q}$ of the flip-flop circuit 603, adapted to generate at its output terminal $Q_4$ reference signals whose potential changes from the high to low level or from the low to high level in response to every 8 clock pulses received and having its output terminal $Q_8$ connected to the reset terminal of the flip-flop circuit 603 through the delay element 604. Numeral 606 designates a shift register of a known type for generating its output in parallel, having its clock terminal connected to the output terminal $Q_4$ of the binary counter 605, its clear terminal connected to the output terminal Q of the flip-flop circuit 603 and its serial input terminal connected to the fifth trigger terminal 220b to convert the demodulated pulse train into a data signal. Numeral 607 designates a latch circuit having its clock terminal connected to the output terminal $Q_8$ of the binary counter 605 and its input terminals connected to the output terminals of the parallel-out shift register 606 and adapted to store the data signal at its output terminals 600a.

Figure 8:
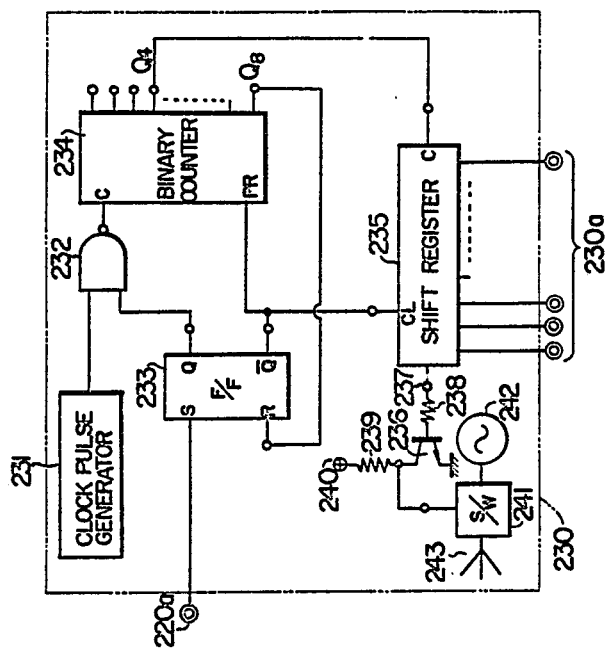
FIG. 8 is a detailed block diagram of the rear transmitter used in the second embodiment.

In FIG. 8 illustrating a detailed block diagram of the rear transmitter 230, numeral 231 designates a clock pulse generator having the same oscillation frequency as the clock pulse generator 131, 232 a NAND gate having its one input terminal connected to the clock pulse generator 231, 233 a flip-flop circuit having its set terminal connected to the fourth trigger terminal 220a and its output terminal Q connected to the other input terminal of the NAND gate 232, 234 a binary counter having its clock terminal connected to the output terminal of the NAND gate 232 and its preset terminal connected to the output terminal Q of the flip-flop circuit 233 and adapted to generate at its output terminal $Q_4$ reference signals which change from the high to low level or from the low to high level in response to every 8 clock pulses received. Flip-flop 233 is reset at its input terminal R by a signal at the $Q_8$ output terminal of counter 234. Numeral 235 designates a shift register having its clock terminal connected to the output terminal $Q_4$ of the binary counter 234 and its clear terminal connected to the output terminal $\overline{Q}$ of the flip-flop circuit 233 and adapted to receive at its second external code terminals 230a a data signal and convert it into a coded train of pulses, 236 a transistor having its base terminal connected to an output terminal 237 of the shift register 235 through a resistor 238, 240 a positive voltage terminal connected to the collector terminal of the transistor 236 through a resistor 239, 241 a high-frequency switch having its control terminal connected to the collector terminal of the transistor 236 and its high-frequency input and output terminals respectively connected to a microwave oscillator 242 and an antenna 243 for accomplishing the required pulse modulation with the pulse train from the shift register 235. The oscillation frequency of the microwave oscillator 242 is selected higher than that of the microwave oscillator 143 by about 400 MHz.

Figure 9:
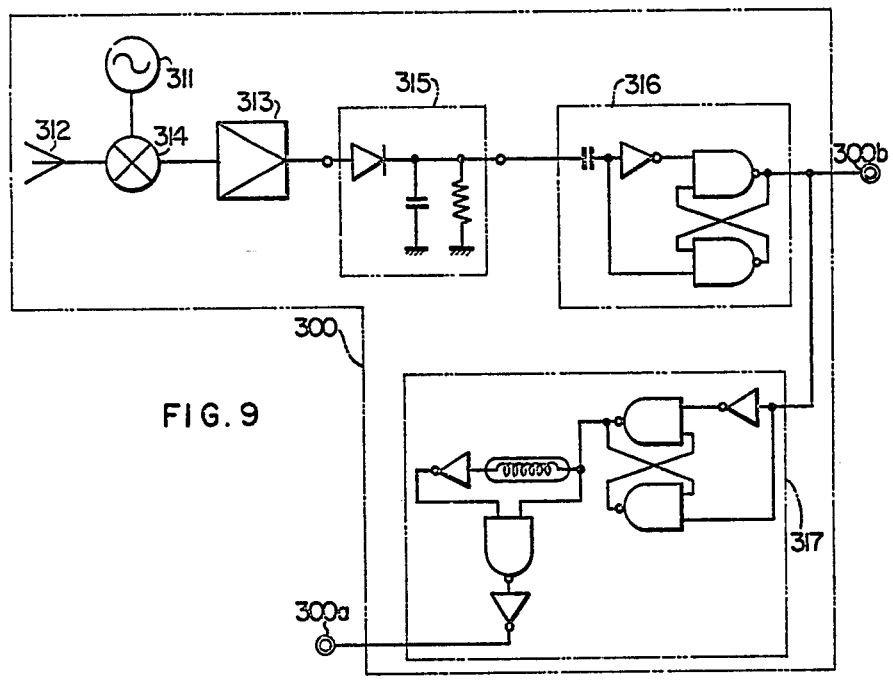
FIG. 9 is a detailed block diagram of the front receiver used in the second embodiment.

In FIG. 9 illustrating a detailed block diagram of the front receiver 300, numeral 311 designates a microwave oscillator which oscillates at a frequency higher than the oscillation frequency of the microwave oscillator 242 by about 200 MHz, 312 an antenna for receiving reply wave, 313 an intermediate frequency amplifier, 314 a mixer, 315 a detector, 316 a signal shaper, 317 a one-shot circuit. These elements are identical in construction with those of the rear receiver 220 in FIG. 6, and a measurement end trigger pulse is generated at the second trigger terminal 300a and the demodulated pulse train is generated at the third trigger terminal 300b.

Figure 10:
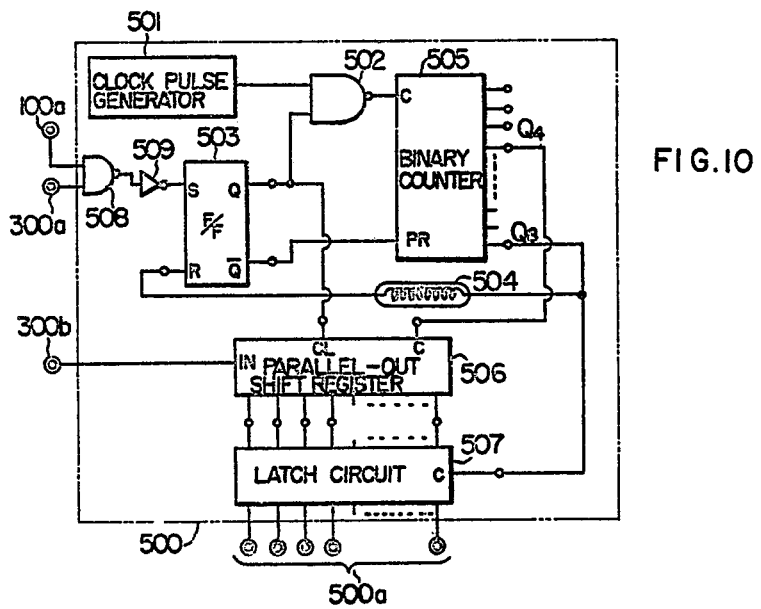
FIG. 10 is a detailed block diagram of another data read circuit used in the second embodiment.

Next, in FIG. 10 illustrating a detailed block diagram of the data read circuit 500, numeral 508 designates a NAND gate, 509 an inverter, 501 a clock pulse generator which oscillates at the same frequency as the clock pulse generator 231, 502 a NAND gate, 503 a flip-flop circuit, 504 a delay element, 505 a binary counter, 506 a parallel-out shift register, 507 a latch circuit. These elements are identical in construction with those of the previously described data read circuit 600, and the demodulated pulse train applied to the third trigger terminal 300b is converted into a data signal and stored at the output terminals 500a.

Figure 11:
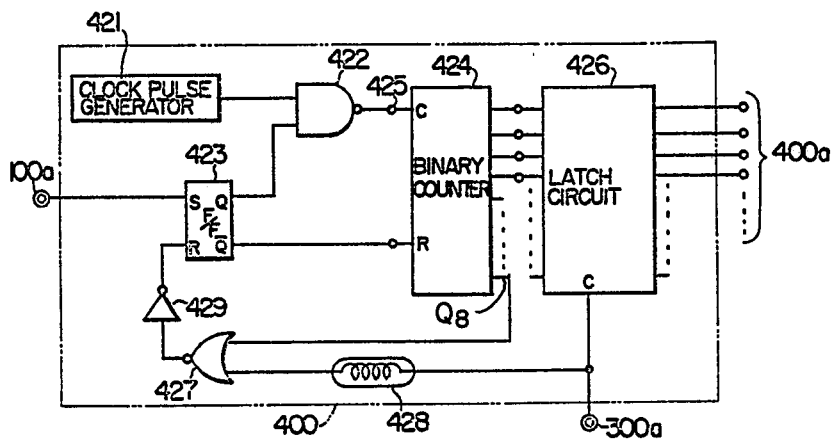
FIG. 11 is a detailed block diagram of the distance detecting circuit used in the second embodiment.

Referring to FIG. 11 illustrating a detailed block diagram of the distance detecting circuit 400, numeral 421 designates a clock pulse generator for generating time measuring clock pulses, 422 a NAND gate having one input terminal connected to the clock pulse generator 421, 423 a flip-flop circuit having its set terminal connected to the first trigger terminal 100a and its output terminal Q connected to the other input terminal of the NAND gate 422, 424 a binary counter having its clock terminal 425 connected to the output terminal of the NAND gate 422 and its reset terminal connected to the output terminal $\overline{Q}$ of the flip-flop circuit 423, 426 a latch circuit having its input terminals $Q_1$ to $Q_8$ connected to the output terminals of the binary counter 424 and its clock terminal connected to the second trigger terminal 300a whereby its input signal is stored at its output terminals 400a when the measurement end trigger pulse is applied to the second trigger terminal 300a. Numeral 427 designates a NOR gate having one input terminal connected to the output terminal $Q_8$ of the binary counter 424, 428 a delay element provided between the second trigger terminal 300a and the other input terminal of the NOR gate 427, 429 an inverter provided between the NOR gate 427 and the reset terminal of the flip-flop circuit 423. With this construction, the time interval between the generation of the measurement start trigger pulse at the first trigger terminal 100a and the generation of the measurement end trigger pulse at the second trigger terminal 300a is measured.

With the construction described above, the operation of the second embodiment will now be described with reference to the waveform diagrams shown in FIGS. 12 and 13.

When, in the front transmitter 100 shown in FIG. 5, a 17-bit logic "10110011000010100" is being applied to the parallel input terminals 124 and 126 of the parallel-load shift register 122, the application of the clock pulses (FIG. 12-701) from the clock pulse generator 121 generate at the output terminal of the parallel-load shift register 122 rectangular signals (FIG. 12-702) having the time interval and time width which are dependent on the 17-bit logic "10110011000010100" applied to the parallel input terminals 124 and 126. These rectangular signals are repeated at intervals of a period 704 (FIG. 12). The application of these rectangular signals results in the generation at the terminal 129 of trigger pulses having a predetermined pulse width as shown in FIG. 12-703. Since each of these trigger pulses establishes the timing of the same series of operations, the series of operations initiated by one of the trigger pulses will be described with reference to the respective waveforms of FIG. 13. In other words, the trigger pulse shown in FIG. 13-705 places the flip-flop circuit 128 in its set state and therefore the NAND gate 130 passes the clock pulses from the clock pulse generator 131. Consequently, the clock pulses shown in FIG. 13-706 are applied to the clock input terminal of the binary counter 132 and the reference signals shown in FIG. 13-707 are generated at the output terminal $Q_4$ of the binary counter 132. Assuming now that the data signal which is to be sent out into the air in front of a vehicle consists of an 8-bit logic "11011101", this logic "11011101" signal is applied to the first external code terminals 100b. When this logic "11011101" is applied to the first external code terminals 100b, it is converted in accordance with the reference signals into a coded train of pulses (FIG. 13-708) which are in turn generated successively at the output terminal 138 of the parallel-load shift register 134. When the number of the clock pulses applied to the binary counter 132 reaches 128 corresponding to a logic "10000000", a high level signal is generated at the output terminal $Q_8$ of the binary counter 132 and the flip-flop circuit 128 is reset. Consequently, the binary counter 132 is preset and the clock pulses are no longer passed through the NAND gate 130, with the result that the binary counter 132 stops counting. Simultaneously, the parallel-load shift register 134 is cleared and the pulse train is no longer delivered from the output terminal 138. The pulse train generated at the output terminal 138 is applied to the one-shot circuit 135 which in turn generates at the first trigger terminal 100a the single measurement start trigger pulse synchronized with the first pulse of the pulse train and shown in FIG. 13-709. At the same time, the pulse train generated at the output terminal 138 is transferred to the base terminal of the transistor 136 through the resistor 137. In other words, when the voltage at the terminal 138 goes to the high level, the transistor 136 is rendered conductive and the voltage at the control terminal 142 of the high-frequency switch 141 goes to the low level. When this occurs, the wave from the microwave oscillator 143 is passed through the high-frequency switch 141 and it is then radiated from the antenna 144 into the air in front of the vehicle. When the voltage at the terminal 138 next goes to the low level, the transistor 136 is rendered nonconductive and the wave from the microwave oscillator 143 is interrupted by the high-frequency switch 141. In response to the repetitions of this operation, the interrogation wave consisting of a series of interrupted pulse waves shown in FIG. 13-710 is radiated through the antenna 144 into the air in front of the vehicle.

The series of the interrupted pulse waves are received by the rear receiver 220 on the preceding vehicle after the lapse of a time proportional to the following distance. In other words, the interrupted pulse waves are received by the antenna 221 of FIG. 6. The received interrogations wave is mixed in the mixer 223 with the wave from the microwave oscillator 222 whose oscillation frequency is higher than that of the microwave oscillator 143 by about 200 MHz and it is converted into the interrupted intermediate frequency signal shown in FIG. 13-711. The intermediate frequency signal of FIG. 13-711 is, after amplification by the intermediate frequency amplifier 224, detected by the detector circuit 225 and it is further reshaped by the signal shaper 227 to generate the demodulated pulse train shown in FIG. 13-712 at the fifth trigger terminal 220b.

On the other hand, the one-shot circuit 228 connected to the signal shaper 227 generates at the fourth trigger terminal 220a the reply trigger pulse (not shown) consisting of a single one-shot pulse synchronized with the first pulse of the demodulated pulse train.

This reply trigger pulse sets the flip-flop circuit 603 in the data read circuit 600 of FIG. 7. Consequently, the clock pulse generator 601 which oscillates at the same frequency as the oscillation frequency of the clock pulse oscillator 131 transfers the clock pulses shown in FIG. 13-713 to the clock terminal of the binary counter 605 through the NAND gate 602. Consequently, as the logic of the binary counter 605 proceeds, it generates at the output terminal $Q_4$ the reference signal (FIG. 13-714) which changes from the high to low level or from the low to high level in response to every 8 clock pulses received, and the reference signal is applied to the clock pulse terminal of the parallel-out shift register 606 and at the same time the demodulated pulse train shown in FIG. 13-712 is applied to the input terminals of the parallel-out shift register 606 from the fifth trigger terminal 220b, with the result that the signals respectively shown in FIGS. 13-715, 13-716, 13-717, 13-718, 13-719, 13-720, 13-721 and 13-722 are generated respectively at the output terminals $Q_1$, $Q_2$, $Q_3$, $Q_4$, $Q_5$, $Q_6$, $Q_7$ and $Q_8$ of the parallel-out shift register 606. Then, at the instant that the 8-bit logic "10000000" is attained at the output terminal $Q_8$ of the binary counter 605, that is, when the 8 pulses of the reference signal are applied to the clock pulse terminal of the parallel-out shift register 606, the 8-bit logic "11011101" is established at its output terminals. At this time, the rising pulse shown in FIG. 13-723 is transferred from the output terminal $Q_8$ of the binary counter 605 to the clock terminal of the latch circuit 607, so that the data signal consisting of the 8-bit logic "11011101" is stored at the output terminals 600a, and it is thus possible to decode and read the data signal transmitted from the front transmitter 100. The rising pulse delivered from the output terminal $Q_8$ of the binary counter 605 also reacts the flip-flop 603 through the delay element 604, and consequently the binary counter 605 is also preset to the initial state to get ready for operation in response to the application of the next reply trigger pulse.

On the other hand, the reply trigger pulse generated at the fourth trigger terminal 220a is also supplied to the rear transmitter 230 shown in FIG. 8 to set its flip-flop circuit 233. Consequently, in the same manner as described in connection with the front transmitter 100 shown in FIG. 5, a reply and data signal applied to the second external code terminals 230a of the parallel-load shift register 235 is converted into a coded pulse train which is in turn delivered to the output terminal 237. In other words, assuming that the clock pulses shown in FIG. 13-724 are applied to the clock terminal of the binary counter 234 and the reply and data signal consisting of an 8-bit logic "10000001" is applied to the second external code terminals 230a, the pulse train shown in FIG. 13-725 is generated at the terminal 237 and therefore the reply wave pulse modulated according to the pulse train and consisting of a series of interrupted pulse waves is responsively radiated from the antenna 243 into the air in the rear of the vehicle and in a direction corresponding to the direction of arrival of the interrogation wave.

The responsively radiated interrupted pulse waves are received by the front receiver 300 on the following vehicle. In other words, this reply wave is received by the antenna 312 of FIG. 9, so that the received wave is mixed in the mixer 314 with the wave from the microwave oscillator 311 which oscillates at a frequency higher than the oscillation frequency of the microwave oscillator 242 by about 200 MHz, and it is then passed through the intermediate frequency amplifier 313, the detector circuit 315 and the signal shaper 316. Consequently, in the same manner as was the case with the rear receiver 220, the demodulated pulse train shown in FIG. 13-726 is generated at the third trigger terminal 300b, and at the same time the measurement end trigger pulse shown in FIG. 13-727 is generated at the second trigger terminal 300a.

The measurement end trigger pulse is applied to the data read circuit 500 of FIG. 10 in which it sets the flip-flop circuit 503 along with the measurement start trigger pulse which has previously been applied to the data read circuit 500 from the first trigger terminal 100a. Consequently, in the same manner as described in connection with the data read circuit 600, the demodulated pulse train applied from the third trigger terminal 300b is converted into the 8-bit logic reply and data signal and it is then stored at the output terminals 500a of the latch circuit 507 thus making it possible to read the reply and data signal, i.e., the 8-bit logic "10000001" received through the air in front of the vehicle.

On the other hand, the measurement end trigger pulse generated at the second trigger terminal 300a is also applied to the distance detecting circuit 400 of FIG. 11, so that it is transferred to the clock terminal of the latch circuit 426 connected to the output terminals of the binary counter 424 which has been counting the time measuring clock pulses from the clock pulse generator 421 in response to the measurement start trigger pulse applied from the first trigger terminal 100a, and the then current count of the binary counter 424 is stored at the output terminals 400a. At the same time, the flip-flop circuit 423 is reset after the expiration of a predetermined time determined by the delay element 428. Consequently, the output terminals of the binary counter 424 are reset to a logic "00000000". The logical value stored at the output terminals 400a represents the number of the clock pulses counted during the time interval between the rising time of the measurement start trigger pulse of FIG. 13-709 and the rising time of the measurement end trigger pulse of FIG. 13-727 and it corresponds to the time required for the wave to travel from the following vehicle to the preceeding vehicle and back to the following vehicle. Therefore, it is possible to determine the following distance from the stored logical value.

Figure 12:
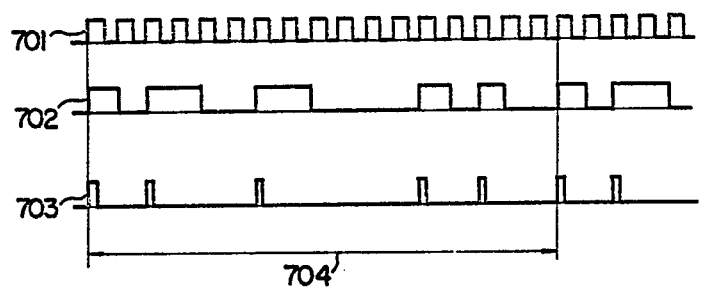
FIGS. 12 and 13 are waveform diagrams which are useful for explaining the operation of the second embodiment.
Figure 13:
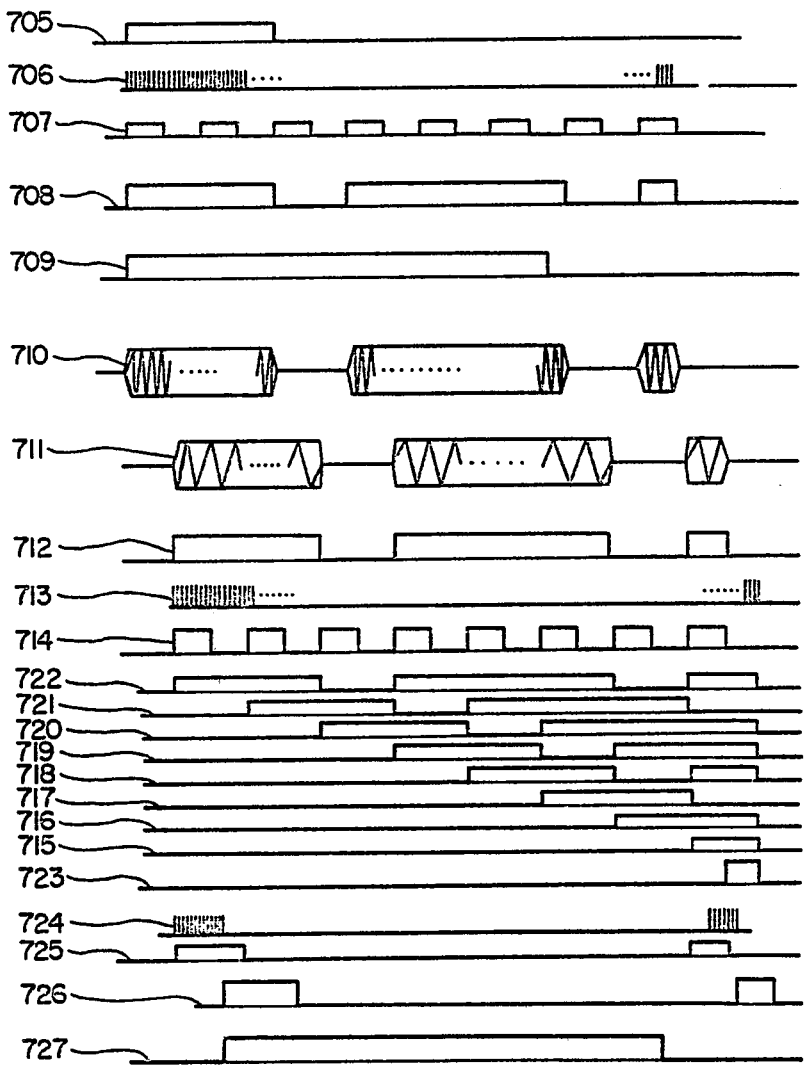

The above-described distance measurement and pulse communication operations of the data signal are repeated in accordance with the individual timing of the generation of the trigger pulses shown in FIG. 12-703. In this case, the timing of the generation of the trigger pulses is randomly changed in accordance with a predetermined 17-bit logic and therefore it is possible to randomly change the radiation period of the interrogation signal radiated from the front transmitter 100 in the interrogator. Consequently, by using a different 17-bit logic for each vehicle, each vehicle has its own radiation period of interrogation wave, with the result that the probability of erroneously receiving the wave radiated from the approaching vehicle in place of the reply wave responding to the interrogation wave radiated from the followed vehicle is minimized and the reliability of the distance measurement and data communication system is improved.

The experiments conducted with the apparatus built in accordance with the second embodiment described above showed that excellent transmission and reception of information and detection of distance were obtained at the following distance of 100 [m] by setting the oscillation frequency of the pulse modulation microwave oscillators 143 and 242 to about 10 [GHz], the microwave oscillator output power to 20 [mW] and the aperture area of the antennas 144, 221, 243 and 312 to 5 [cm]×5[cm].

Further, in transmitting the reply and data signal from the rear transmitter 230 in the transponder, it is only necessary to preset so that at least the first one bit of the coded pulse train for pulse modulation has a high level.

Furthermore, where it is desired to generate a distance signal given in units of meters, it is only necessary to suitably select the oscillation frequency of the clock pulse generator 421 which generates time measuring clock pulses.

What is claimed is:

1. In the method of measuring the distance that a rear vehicle is following a front vehicle running in the same direction as said rear vehicle by measuring the time from transmission of an interrogation signal by the rear vehicle to receipt by the rear vehicle of a reply signal generated by a transponder in said front vehicle in response to said interrogation signal, the improvement in said method of minimizing the probability of the rear vehicle erroneously receiving from a third vehicle approaching said rear vehicle from the opposite direction a similar interrogation signal instead of a responding reply signal from said front vehicle by differently coding said interrogation signals of said rear and third vehicles, comprising the steps of:

generating at said rear vehicle a pulse train including developing and continuously repeating a series of pulses having leading edge intervals coded by a first unique code for causing said pulse train to have a first predetermined pulse interval duration pattern in which contiguous ones of said successive pulse intervals in said train are of different duration and for causing each said pulse interval to be greater than a given duration corresponding to a radiated signal transmission turnaround time for said accurately measurable maximum distance, developing a measurement start signal at said rear vehicle from each said pulse in said train, radiating from said rear vehicle in at least said running direction a first pulse wave interrogation signal containing pulses corresponding to the pulses in said pulse train, receiving said pulse wave interrogation signal by said transponder at said front vehicle and radiating therefrom in said opposite direction a respective reply pulse in response to each said corresponding pulse in said pulse wave interrogation signal, receiving said reply pulses at said rear vehicle, developing at said rear vehicle a respective measurement end signal from each received reply pulse, successively measuring the duration of the resulting non-overlapping successive time intervals occurring between each measurement start signal and its corresponding measurement end signal, converting the successive time interval durations into respective distance representations, and radiating in said opposite direction from said approaching third vehicle toward said rear vehicle a second pulse wave interrogation signal containing a second pulse train including a continuously repeating second series of pulses having leading edge intervals coded by a second unique code different than said first code for causing said second pulse train to have a second predetermined pulse interval duration pattern similar to said first pattern in that each pulse interval is greater than said given duration and in that contiguous ones of said successive pulse intervals in said second train are of different duration but different in that the sequences of said different duration pulse intervals in the respective pulse series are different for reducing the probability of a pulse in said second interrogation signal being effectively received during the occurrence of any of said successive time intervals between corresponding measurement start and end signals while said third vehicle is approaching said rear vehicle, thereby enhancing the validity of the measurements of said successive time intervals and of their said distance representations.

2. A method as in claim 1 including generating said second series of pulses and the first mentioned series of pulses in accordance with different predetermined binary numbers which respectively are said second and first unique codes.

3. A method as in claim 1 and further including:

transmitting each pulse starting a said pulse interval at said rear vehicle as a transmitter information signal containing a plurality of data pulses coded in length and intervals in accordance with a data signal, and recovering said data signal from each said transmitted information signal received at said front vehicle.

4. A method claim as in claim 1 or 3 and further including:

transmitting each said reply pulse from said front vehicle to said rear vehicle as a transponder information signal containing a plurality of transponder data pulses coded in length and intervals in accordance with a transponder data signal, and recovering said transponder data signal from each said transmitted transponder information signal received at said rear vehicle.

5. In a system for measuring the distance that a rear vehicle is following a front vehicle running in the same direction, the improvement comprising:

means including a first transmitter and an adjacent receiver for said rear vehicle and a transponder for said front vehicle for accurately measuring the turnaround time of an interrogation signal transmission from said transmitter to the receipt by said receiver of a reply pulse transmitted by said transponder up to a predetermined maximum measuring distance between said rear and front vehicles, said measuring means further including means for connecting said first transmitter in accordance with a first unique code for minimizing the probability of said rear vehicle receiver first receiving instead of a corresponding reply signal a similar interrogation signal from the opposite direction from an approaching third vehicle having a similar transmitter but connected to a different unique code, said first transmitter including means for generating a pulse train by developing and continuously repeating a series of pulses having successive leading edge intervals coded by said first unique code which is predetermined to cause said successive pulse intervals in said train to be different in duration and to cause each of said pulse interval to be greater than a given duration corresponding to said maximum distance turnaround time between rear and front vehicles, said first transmitter further including means for radiating in at least said running direction an interrogation signal with pulses corresponding to the pulses in said pulse train, means in said measurement means adjacent said first transmitter and responsive to each said pulse of said train for developing a measurement start signal having a specified point in time concurrent with the start of radiation of each said corresponding pulse, said transponder including means for receiving said interrogation signal and radiating in said opposite direction a respective reply pulse in response to each said corresponding pulse in said interrogation signal, said receiver being operative to receive said reply pulses and develop for each a respective measurement end signal, and means in said measuring means adjacent said transmitter and receiver for successively determining the duration of the resulting non-overlapping successive time intervals occurring between each measurement start signal and its corresponding measurement end signal.

6. A system as in claim 5 wherein said pulse train generating means includes a clock pulsed shift register having a multiplicity of parallel input terminals interconnected in accordance with said first predetermined unique code.

7. A system as in claim 6 wherein each of said input terminals is connected to one of two signal levels in accordance with a respective digit of a predetermined binary number which is said first unique code.

8. A system as in claim 5 and further including:
means in said transmitter and operative during each said pulse interval for developing from the pulse starting that interval an information signal containing a plurality of data pulses coded in length and intervals in accordance with a data signal,
each said corresponding pulse in said transmitter radiated interrogation signal including a said information signal which is received by said transponder receiving means, and
means connected to said transponder receiving means for operating on said received information signal to recover said data signal at the location of said transponder.

9. A system as in claim 5 or 8 and further including:
means in said transponder for developing from each said corresponding pulse a transponder information signal containing a plurality of transponder data pulses coded in length and intervals in accordance with a transponder data signal,
each said transponder radiated reply pulse including a said transponder information signal which is received by said receiver, and
means connected to said receiver for operating on said transponder information signal received at said receiver to recover said transponder data signal.

10. A system as in claim 5, 6, 7 or 8 wherein said pulse train generating means includes means for causing the said pulses in said train to be of constant width.

* * * * *